United States Patent [19]

Wöber et al.

[11] Patent Number: 4,793,603
[45] Date of Patent: Dec. 27, 1988

[54] LATERAL PRESSURE PAD FOR POSITIONING WORKPIECES

[76] Inventors: Ralf Wöber, Märkerstrasse 19, D-6000 Frankfurt 56; Dieter Reis, Friedesstrasse 21; Stanko Petroci, Lübecker Strasse 3, both of D-6236 Eschborn, all of Fed. Rep. of Germany

[21] Appl. No.: 817,750
[22] PCT Filed: Apr. 6, 1985
[86] PCT No.: PCT/DE85/00102
 § 371 Date: Dec. 5, 1985
 § 102(e) Date: Dec. 5, 1985
[87] PCT Pub. No.: WO85/04611
 PCT Pub. Date: Oct. 24, 1985

[30] Foreign Application Priority Data

Apr. 9, 1984 [DE] Fed. Rep. of Germany ....... 3413298

[51] Int. Cl.$^4$ .............................................. B25B 1/00
[52] U.S. Cl. ................. 269/254 R; 269/391; 269/303; 269/317
[58] Field of Search .............. 269/221, 254 R, 254 CS, 269/289 R, 291, 303, 315–317

[56] References Cited

U.S. PATENT DOCUMENTS

| | | | |
|---|---|---|---|
| 477,098 | 6/1892 | Brown et al. | 269/254 R |
| 2,005,161 | 6/1935 | Petersen | 269/254 R |
| 2,955,820 | 10/1960 | Berg | 269/221 |

FOREIGN PATENT DOCUMENTS 2503246 5/1978 Fed. Rep. of Germany .

Primary Examiner—Robert P. Olszewski
Assistant Examiner—Judy J. Hartman
Attorney, Agent, or Firm—Steinberg & Raskin

[57] ABSTRACT

The invention relates to a lateral pressure pad for positioning workpieces on a support provided with one or more stops, employing resilient pressure with a retaining pin 1 partially enclosed in a housing and insertable with the housing in an aperture of the support. The pin is provided with a flange 3 abutting the housing wall 2 and is pressed with its flange against the inwardly angled housing rim 6 by a compression spring arranged in the housing between the housing bottom 4 and flange 3. The spring force of the compression spring 5 can be varied by an adjusting element adjustable in the housing bottom 4 via a set screw 8.

19 Claims, 1 Drawing Sheet

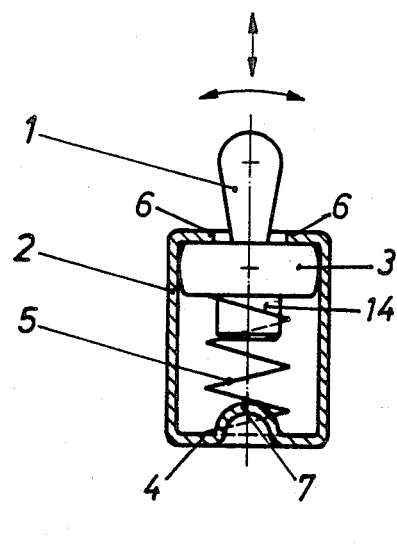
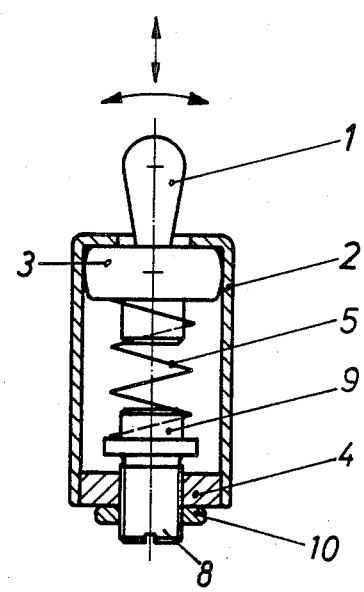
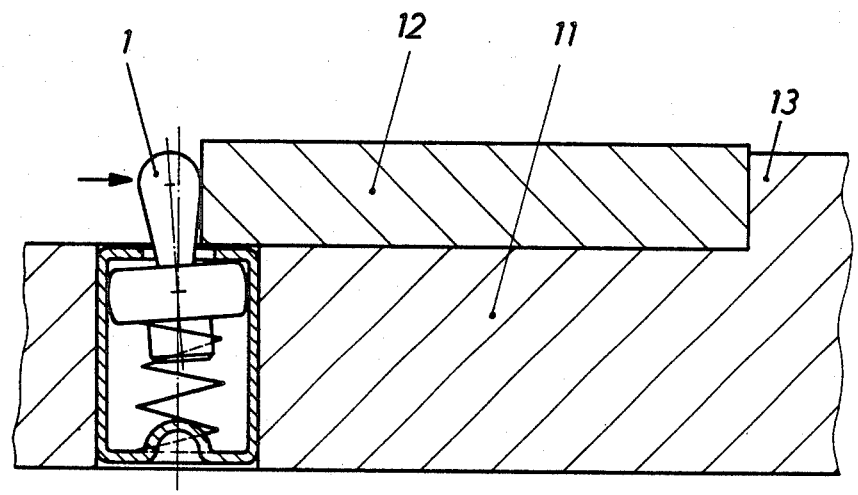

LATERAL PRESSURE PAD FOR POSITIONING WORKPIECES

BACKGROUND OF THE INVENTION

The invention relates to a lateral pressure pad for positioning workpieces on a support provided with one or more stops, employing resilient pressure means with a retaining pin partially enclosed in a housing and embedable with the housing in an aperture of the support.

Lateral pressure pads of the above-described type are known from the prior German patent No. 2,503,246 for example. In these lateral pressure pads the retaining pin is embedded in a resilient material and thus retained resiliently, that is to say that when it is moved out of its normal position by the exertion of a correspondingly strong force, it tends to return into this normal position.

A workpiece which is clamped between two stops and this lateral pressure pad, for example, is consequently retained by this lateral pressure pad with a force which is a function of the resilience of the resilient material used on the one hands and of the degree of the deflection of the retaining pin out of its normal position by the workpiece on the other hand.

These lateral pressure pads are excellently suited for the short-term fastening of workpieces.

However, disadvantages, which are due to a permanent deformation of the elastomer material, arise in the case of long-term use.

In fact, if a workpiece is anchored for a prolonged period in the case of such a known lateral pressure pad, then a permanent deformation of the elastomer material occurs, with the result that the retaining pin no longer returns completely into its original position after the workpiece is released.

SUMMARY OF THE INVENTION

The object of the present invention is to overcome this disadvantage and to develop a lateral pressure pad of the type initially defined which is suitable for both the short-term and the long-term fastening of workpieces on a support.

This object is achieved with a lateral pressure pad for positioning workpieces on a support provided with one or more stops, employing resilient pressure means with a retaining pin partially enclosed in a circular housing and insertable with the housing in an aperture of the support, wherein the retaining pin is provided with a flange abutting the housing wall and is pressed with its flange against the inwardly angled housing rim by a compression spring arranged in the housing between housing bottom and flange.

In the case of a lateral pressure pad according to the invention defined in the above terms, the retaining pin is deflectable in every direction out of its normal position, and the flange is moved out of its normal position with it counter to the spring force. This means that the spring force tends to press the flange back into its normal position and therefore also simultaneously to restore the retaining pin into its normal position.

This restoring force is then generated by the compression spring, which is arranged between housing bottom and flange. The stronger the spring force of this compression spring is, the greater is the restoring force with which the retaining pin ultimately tends to return into its normal position.

Compared to the known lateral pressure pad described initially, the lateral pressure pad according to the invention is distinguished, due to the use of a customary compression spring, by a substantially greater insensitivity to material fatigue, it therefore has a virtually unlimited static and dynamic load capacity. Moreover, the compression spring permits longer spring strokes than the elastomer material used in the known lateral pressure pads; therefore substantially greater tolerances in the workpieces to be fastened can be compensated with the lateral pressure pad according to the invention.

Furthermore, the lateral pressure pads according to the invention are distinguished by greater resistance to thermal effects and chemicals, particularly all types of solvents, and they are also virtually insensitive to corrosion if stainless spring steel is used for the compression spring.

It has been found to be particularly advantageous if, in the lateral pressure pad according to the invention, the flange of the retaining pin is provided with a partial spherical external surface. In the case of a cylindrical housing, such an external surface permits a deflection of the retaining pin, and simultaneously a tilting of the flange abutting the housing wall, without the flange losing its guidance against the housing wall. Such a form of construction is particularly distinguished by an extremely uniform variation of the spring force during the deflection of the retaining pin from its normal position.

The same object is also achieved if the housing is of partial hollow conical construction in the region of the flange. Such a form of construction produces, even with a simple disk-shaped flange, good guidance across the entire deflection range, on the other hand such a form of construction in conjunction with a partial spherical external surface of the flange is virtually ideal for the guidance during the deflection of the retaining pin.

As has already been mentioned, the restoring force of the retaining pin may be varied by inserting a spring of different strength into the lateral pressure pad according to the invention.

The lateral pressure pad according to the invention can therefore be supplied with different restoring forces.

However, in practical application the necessity frequently arises to modify the restoring force of a particular available lateral pressure pad. This can be effected by a particularly advantageous form of construction of the present invention, in that the spring force of the compression spring is constructed variably by means of an adjusting element. Such a variation of the spring force of the compression spring can therefore be effected by means of a set screw arranged in the housing bottom and provided with a stop for the compression spring, which is optionally locked by a check nut or in other known manner.

With a set screw of this type the spring force of the compression spring in the housing can be varied within a wide range, and therefore also the restoring force of the retaining pin.

By means of suitable marks on the set screw on the one hand and on the housing of the lateral pressure pad on the other hand, definite spring forces of the compression spring, and therefore definite restoring forces for the retaining pin, can thus be adjusted.

Although the retaining pin may exhibit any desired shape, it has been found convenient if it is constructed as a cylindrical pin and provided with a rounded crest protruding out of the support. According to another advantageous form of construction of the present invention the retaining pin is provided with a spherical head protruding out of the support. Another version provides a retaining pin with a conical head protruding out of the support. All these forms of construction are suitable for clamping workpieces between one or two fixed stops and the retaining pin.

The housing of the lateral pressure pad according to the invention, which is conveniently produced in metal, is conveniently let flush into the support, so that only the retaining pin protrudes out of the aperture of the support.

According to a particularly advantageous form of construction of the present invention, the retaining pin is provided beyond the flange with a prolongation which represents centering means for the compression spring, which is customarily of spiral construction.

Such centering means is found highly advantageous, particularly when the compression spring does not correspond exactly to the diameter of the housing.

In addition, a corresponding projection may also be fitted in the bottom of the housing, to serve likewise for the centering of the compression spring and thus fulfill the same purpose mentioned above.

The lateral pressure pads according to the invention are additionally distinguished, in comparison with the lateral pressure pads hitherto known, in that they can absorb or transmit compressive forces not only in two directions, but in three different directions. The spring materials employed for the construction are available commercially in a very wide range of specifications, so that the pressure pads according to the invention can be produced with standard materials for all conceivable requirements.

BRIEF DESCRIPTION OF THE DRAWINGS

The invention is explained more fully and in detail below with reference to the examples of construction illustrated in the accompanying drawings, wherein:

FIG. 1 shows a side elevation of the lateral pressure pad according t the invention in section;

FIG. 2 shows a side elevation of another form of construction of the lateral pressure pad according to the invention in section, in which the spring force is variable by means of a set screw; and FIG. 3 shows the arrangement of the lateral pressure pad according to the invention in a support in section when clamping a workpiece.

DESCRIPTION OF THE PREFERRED EMBODIMENTS

The lateral pressure pad according to the invention illustrated in FIG. 1 consists of a retaining pin 1 enclosed partially in a housing and insertable with the latter in the aperture of a support, which is provided with a flange 3 abutting the housing wall and is pressed with its flange 3 against the inwardly angled rim 6 of the housing 2 by a compression spring 5 arranged in the housing between housing bottom 4 and flange 3. The flange 3 of the retaining pin 1 is provided with a partial spherical external surface with which it abuts the housing wall. This partial spherical external surface permits, in the case of a cylindrically constructed housing wall, a deflection of the retaining pin and a simultaneous tilting of the flange, without the flange losing its guidance on the housing wall. A highly uniform transmission of the spring force to the deflection of the retaining pin out of its normal position is therefore achieved by this partial spherical external surface of the flange.

An inwardly directed dome 7, which serves to center the compression spring 5, is arranged in the bottom 4 of the housing 2. A prolongation 14 of the retaining pin 1 beyond the flange 3 has the same object. This prolongation 14 is likewise enclosed by the compression spring 5 and therefore serves to maintain the compression spring 5 in its position.

In the form of construction illustrated in FIG. 2, a set screw 8 is arranged adjustably in a corresponding screw-threaded aperture in the housing bottom 4. This set screw 8 exhibits a stop or rest 9 for the compression spring 5. This rest can be moved nearer to the flange 3 of the retaining pin 1 by rotating the set screw 8, whereby the tensioning force of the compression spring 5 is intensified.

The set screw 8 is locked in its desired position by means of a check nut 10.

FIG. 3 shows the lateral pressure pad according to the invention in section, inserted in a support 11. The workpiece 12 is then clamped between a stop 13 and the retaining pin 1 of the lateral pressure pad according to the invention and is retained in this position by the restoring force of the retaining pin 1.

FIGS. 1 and 2 illustrate by arrows three-dimensional possibilities of movement for the head of the retaining pin 1.

The retaining pin can therefore be moved laterally in all directions, and it can furthermore also move in the vertical direction counter to the force of the compression spring 5.

We claim:

1. A lateral pressure pad assembly for positioning a workpiece being located on a support, the support having one or more stationary stops, said lateral pressure pad assembly comprising:
   a housing including opposed side walls and opposed top and bottom walls, said top wall having an opening formed therein,
   retaining means including a retaining pin and a flange having a greater width than said retaining pin connected thereto, said flange having an outer edge surface,
   said flange positioned within said housing with said outer edge surface of said flange contiguous with said side walls of said housing, and with said retaining pin extending from said flange through said opening formed in said housing top wall and projecting outwardly thereof,
   means for allowing lateral movement of the retaining pin towards and away from the one or more stationary stops including said outer edge surface of said flange being at least partially curved to permit said flange to tilt with respect to a longitudinal axis extending through said opening such that said flange maintains its contiguous relationship with said housing side walls, and
   said opening in said housing top wall having a dimension greater than the dimension of a portion of said retaining pin passing therethrough to thereby permit said flange and retaining pin to tilt about said longitudinal axis, and
   spring means for urging said flange towards said top wall of said housing,
   such that the workpiece is gripped between said retaining pin and the one or more stationary stops.

2. The assembly of claim 1, wherein said opening is bounded by an inwardly angled housing rim on the housing top wall.

3. The assembly of claim 1, wherein said flange comprises a partially spherical external surface continguous said housing side walls.

4. The assembly of claim 1, wherein the housing comprises a partially hollow spherical construction in a region of said flange.

5. The assembly of claim 1, additionally comprising an adjusting element for varying force of said spring means.

6. The assembly of claim 5, wherein said adjusting element comprises a set screw situated in said bottom wall of said housing and having a stop situated thereof for receiving said spring means.

7. The assembly of claim 1, wherein said retaining pin is substantially cylindrical and comprises a rounded crest protruding through said opening.

8. The assembly of claim 1, wherein said retaining pin comprises a substantially spherical head protruding through said opening.

9. The assembly of claim 1, wherein said housing is situated with said top wall thereof substantially flush with a top wall of the support.

10. The assembly of claim 1, wherein said retaining means additionally comprise a prolongation extending from an opposite side of the flange from said pin and constituting means for centering said spring means comprising a spiral-shaped compression spring.

11. The assembly of claim 1, wherein said assembly is disposed to absorb or transmit compressive force in three different directions.

12. The assembly of claim 1, wherein said bottom wall of said housing comprises an inwardly-projecting dome upon which said spring means are disposed and constituting means for centering said spring means.

13. The assembly of claim 10, wherein said prolongation extends into said spiral-shaped compression spring.

14. The assembly of claim 6, additionally comprising a lock nut for locking said set screw into position.

15. The assembly of claim 6, wherein said stop extends into said spring means.

16. The assembly of claim 1, wherein said housing is of partially hollow, conical construction in a region of said flange.

17. The assembly of claim 1, wherein said opening dimension is less than a corresponding dimension of said flange adjacent thereto,
   whereby said flange rests against an interior side of said top wall of said housing when urged thereagainst by said spring means in normal position.

18. The assembly of claim 17, wherein said housing comprises a substantially hollow interior, with said flange positioned at an upper end of said interior and said spring means positioned away from inner surfaces of said housing side walls,
   whereby, when said pin is tilted, said pin is laterally restorable to said normal position by uniform pressure applied by said spring means to said flange.

19. The assembly of claim 1, additionally comprising means for providing restorable force to said pin, comprising
   said spring means being shaped and positioned within said housing to urge said pin to a balanced substantially upright rest position.

* * * * *